United States Patent
Bassoli (10) Patent No.: US 11,406,114 B2
(45) Date of Patent: Aug. 9, 2022

(54) SPIRIT INFUSED COFFEE BEANS

(71) Applicant: Starbucks Corporation, Seattle, WA (US)

(72) Inventor: Denisley Gentil Bassoli, Renton, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 16/016,094

(22) Filed: Jun. 22, 2018

(65) Prior Publication Data

US 2019/0387764 A1   Dec. 26, 2019

(51) Int. Cl.
  *A23F 5/02* (2006.01)
  *A23F 5/04* (2006.01)
  *C12G 3/07* (2006.01)

(52) U.S. Cl.
  CPC ............... *A23F 5/02* (2013.01); *A23F 5/04* (2013.01); *C12G 3/07* (2019.02)

(58) Field of Classification Search
  None
  See application file for complete search history.

(56) References Cited

U.S. PATENT DOCUMENTS

| | | | | |
|---|---|---|---|---|
| 7,220,440 B2 * | 5/2007 | Dria | ...................... | A23F 5/163 426/432 |
| 8,771,769 B2 * | 7/2014 | Smyth | .................... | A23B 9/30 426/93 |
| 9,364,012 B2 | 6/2016 | Pellegrini | | |
| 2002/0155209 A1 * | 10/2002 | Hardesty | .................. | A23F 5/10 426/594 |
| 2005/0271777 A1 | 12/2005 | Orsini | | |
| 2012/0244254 A1 * | 9/2012 | Takahashi | ............... | A23F 5/243 426/45 |
| 2014/0106038 A1 * | 4/2014 | Buschmann | ............. | A23F 5/04 426/296 |
| 2015/0250198 A1 | 9/2015 | Piskorz et al. | | |
| 2015/0257405 A1 * | 9/2015 | Kelly | ........................ | A23F 5/02 426/45 |

(Continued)

FOREIGN PATENT DOCUMENTS

| | | |
|---|---|---|
| EP | 0837126 | 4/1998 |
| EP | 1 593 735 | 11/2005 |
| WO | WO 03/010279 | 2/2003 |

(Continued)

OTHER PUBLICATIONS

Bruner: Wine-Infused Coffee Is Here So You Officially Can Now Have It Both Ways; Time: Food and Drink; published online at least by Mar. 4, 2017 at: https://web.archive.org/web/20170403181919/ https://time.com/4690609/wine-infused-coffee/ (Year: 2017).*

(Continued)

*Primary Examiner* — Patricia A George
(74) *Attorney, Agent, or Firm* — Knobbe, Martens, Olson & Bear, LLP (57) ABSTRACT

Generally described are methods of preparing flavor-infused coffee beans by preparing a flavor-infused spirit, steeping coffee beans in the flavor-infused spirit, and roasting the flavor-infused coffee beans. Some embodiments relate to flavor-infused coffee beverages prepared from flavor-infused coffee beans.

18 Claims, 2 Drawing Sheets

(56) References Cited

U.S. PATENT DOCUMENTS

2016/0355771 A1* 12/2016 Davis ............... C12G 3/07
2019/0390147 A1 12/2019 Bassoli

FOREIGN PATENT DOCUMENTS

WO  WO 2019/245631  12/2019
WO  WO 2019/245632  12/2019

OTHER PUBLICATIONS

Jack Daniel's™: Tennessee Whiskey Coffee; published online at least by Nov. 5, 2016 at: https://web.archive.org/web/20161105024843/http://www.jackdanielscoffee.com/ (Year: 2016).*

Str: strmrnnr: Recycle Scrap Wood for the Enhancement of Spirits; published online at least by Apr. 11, 2017 at: https://web.archive.org/web/20170411033902/http://www.instructables.com/id/Recycle-Scrap-Wood-for-the-Enhancement-of-Spirits/ (Year: 2017).*

WW: Woodchucks Wood: Box full of scap; published online at least by Mar. 19, 2017 at: https://www.amazon.com/Full-Scrap-Boards-Shorter-Lengths/dp/B01D7MYAVC/ref=cm_cr_arp_d_product_top?ie=UTF8 (Year: 2017).*

TO: Time and Oak Signature Whiskey Elements: published online at least by Jan. 26, 2015 (as evidenced by the comment by Jane Y) at: https://www.amazon.com/Time-Oak-Signature-Whiskey-Elements/dp/B0765BGPS1 (Year: 2015).*

Eckelman: Wood Moisture Calculations: published by Perdue University in FNR-157 on Feb. 25, 1997 (Year: 1997).*

Aqua-Calc: alcoholic beverage . . . ; published online at least by Oct. 26, 2015 at: https://web.archive.org/web/20151026024531/https://www.aqua-calc.com/calculate/food-volume-to-weight/substance/alcoholic-blank-beverage-coma-and-blank-distilled-coma-and-blank-all-blank- . . . (Year: 2015).*

Wiki: Coffee production; published online at least by Mar. 6, 2013 at: https://web.archive.org/web/20130306130404/http://en.wikipedia.org:80/wiki/Coffee_production#Dry_process (Year: 2013).*

'401: TW 201134401 A; published Oct. 16, 2011. (Year: 2011).*

NEL: Northest Edible Life: Infuse your booze; published at least by Nov. 4, 2014 (as evidenced by the comment by David) online at: http://nwedible.com/infuse-your-booze-a-complete-guide-to-diy-flavored-liquors/ (Year: 2014).*

AB: Aussie Brewer: Using Oak Chips & Whisky Profile Kits!; published online at least by Apr. 22, 2018 at: https://web.archive.org/web/20180422121145/https://aussiebrewer.com.au/customizing-your-spirit/ (Year: 2018).*

International Search Report and Written Opinion in corresponding PCT/US2019/026119 dated Jul. 1, 2019 in 16 pages.

International Search Report and Written Opinion in corresponding PCT/US2019/026084 dated Aug. 30, 2019 in 13 pages.

Dadi et al., "Valorization of coffee byproducts for bioethanol production using lignocellulosic yeast fermentation and pervaporation", International Journal of Environmental Science and Technology, Aug. 2017, vol. 15, Issue 4, pp. 821-832.

Product page on The Wayback Machine for Jack Daniel's Tennessee Whiskey Coffee, https://web.archive.org/web/20161105024843/http://www.jackdanielscoffee.com, published online at least by Nov. 5, 2016.

Bruner, "Wine-Infused Coffee is Here so You Officially Can Now Have it Both Ways", https://news.yahoo.com/wine-infused-coffee-officially-now-220250750.html, Mar. 4, 2017.

STRMRNNR, "Recycle Scrap Wood for the Enhancement of Spirits", Instructables, Apr. 14, 2009.

Office Action issued in Taiwan Application No. 108115073 dated May 6, 2022.

* cited by examiner

SPIRIT INFUSED COFFEE BEANS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

Several embodiments of the present disclosure relate to infusing coffee beans with flavor-containing substances.

BACKGROUND

Coffee is a brewed beverage typically prepared by steeping ground coffee beans in hot water. Although coffee is widely appreciated as having a desirable flavor and aroma, consumers frequently enjoy coffee beverages with additional flavor additives. For instance, a variety of flavored coffee additives are available to prepare flavored coffee beverages, including peppermint, hazelnut, vanilla, and the like. However, incorporating additional flavorings into a brewed coffee beverage can be cumbersome and time consuming for consumers.

SUMMARY

Manufacturers have prepared flavored coffee beans to facilitate the production of flavored coffee beverages. Typically, flavored coffee beans are prepared by spraying flavored oils onto roasted coffee beans. The flavored oils may include a variety of aromatic compounds selected to exhibit a desired flavor profile. However, the flavored oils reside on the exterior surface of the coffee beans, and are subject to atmospheric degradation, whereby the aromatic compounds within the oil degrade over time, and the oils themselves may become rancid. Moreover, the flavored oils typically contain synthetic additives and are associated with less premium products. Manufacturers are also limited in the flavors which can be produced in this manner. For instance, it is difficult to impart into the coffee beans the complex and subtle notes of certain desirable flavors of barrel-aged spirits through the use of flavored oils.

Many consumers desire flavored coffee beverages. However, techniques for incorporating additional flavoring components are subject to several disadvantages, including the use of chemical additives, and increased opportunity for spoilage. Accordingly, disclosed herein are techniques and methods for preparing flavor-infused coffee beans in a more efficient and cost-effective manner. Further disclosed herein are techniques and methods for preparing flavor-infused coffee beverages.

In some embodiments, the present disclosure relates to a method of preparing flavor-infused roasted coffee beans. In various configurations, the method comprises: steeping coffee beans in a flavor-infused spirit. In some implementations, a flavor-infused spirit may be prepared by extracting a portion of wood in a high-alcohol content spirit. The wood may be partitioned into smaller portions, such as chips, dowels, rods, staves, or any other form factor. For instance, in various configurations, the wood may be partitioned into briquettes. The briquettes of wood may be separated from the high-alcohol content spirit to yield a flavor-infused spirit. Moreover, in some configurations, coffee beans may be steeped within the flavor-infused spirit. In some embodiments, the coffee beans may be green coffee beans. Then, the coffee beans may be separated from the flavor-infused spirit to yield flavor-infused green coffee beans. In various implementations, the flavor-infused coffee beans may then be roasted to yield flavor-infused roasted coffee beans.

In further embodiments of the techniques and methods disclosed herein, the portions of wood comprise at least one of natural wood, toasted wood, charred wood, burned wood, or smoked wood. In some embodiments, the portions of wood are briquettes partitioned into cubes ranging from about 0.1 in$^3$ to about 2.0 in$^3$, such as about 0.1 in$^3$; about 0.2 in$^3$; about 0.3 in$^3$; about 0.4 in$^3$; about 0.5 in$^3$; about 0.6 in$^3$; about 0.7 in$^3$; about 0.8 in$^3$; about 0.9 in$^3$; about 1.0 in$^3$; about 1.1 in$^3$; about 1.2 in$^3$; about 1.3 in$^3$; about 1.4 in$^3$; about 1.5 in$^3$; about 1.6 in$^3$; about 1.7 in$^3$; about 1.8 in$^3$; about 1.9 in$^3$; about 2.0 in$^3$; and any value therein. In various additional configurations, the wood may be partitioned into staves, dowels, rods, or other suitable form factors. For instance, in various configurations, the wood may be partitioned into dowels having a diameter of about 0.1 in to about 2.0 in, such as about 0.1 in; about 0.2 in; about 0.4 in; about 0.6 in about 0.8 in; about 1.0 in; about 1.2 in; about 1.4 in; about 1.6 in; about 1.8 in; about 2.0 in; or any value therein. Similarly, the wooden dowels may have a length of about 0.1 in to about 4 in, such as about 0.1 in; 0.2 in; 0.4 in; 0.8 in; 1.0 in; 1.2 in; 1.4 in; 1.6 in; 1.8 in; 2.0 in; 2.2 in; 2.4 in; 2.6 in; 2.8 in; 3.0 in; 3.2 in; 3.4 in; 3.6 in; 3.8 in; 4.0 in; or any value therein. However, it will be appreciated that the precise dimensions of the wood may be varied widely without deviating from the scope of the present disclosure.

In some embodiments, the high-alcohol content spirit has an alcohol content of about 30 degrees Gay-Lussac (GL) to about 70 GL. In still further embodiments, the high-alcohol content spirit comprises at least one of: bourbon, whiskey, rye, gin, tequila, vodka, brandy, sherry, rum, and combinations thereof and the like. In some configurations, the briquettes of wood are extracted in the high-alcohol content spirit for a period of time ranging from about 15 minutes to about 80 hours, such as about 15 minutes; about 30 minutes; about 1 hour; about 2 hours; about 3 hours; about 4 hours; about 5 hours; about 6 hours; about 7 hours; about 8 hours; about 9 hours; about 10 hours; about 12 hours; about 14 hours; about 16 hours; about 18 hours; about 20 hours; about 22 hours; about 24 hours; about 26 hours; about 28 hours; about 30 hours; about 32 hours; about 34 hours; about 36 hours; about 38 hours; about 40 hours; about 42 hours; about 44 hours; about 46 hours; about 48 hours; about 50 hours; about 52 hours; about 54 hours; about 56 hours; about 58 hours; about 60 hours; about 62 hours; about 64 hours; about 66 hours; about 68 hours; about 70 hours; about 72 hours; about 74 hours; about 76 hours; about 78 hours; about 80 hours; and any value therein. In other configurations, the ratio of wood briquettes to high-alcohol content spirit is about 1.0:0.8 to 1.0:3.0, such as about 1.0:0.8; about 1.0:1.0; about 1.0:1.2; about 1.0:1.4; about 1.0:1.6; about 1.0:1.8; about 1.0:2.0; about 1.0:2.2; about 1.0:2.4; about 1.0:2.6; about 1.0:2.8; about 1.0:3.0; or any value therein. In some embodiments, the extraction temperature may range from about 1° C. to about 70° C., including about 2° C.; about 4° C.; about 6° C.; about 8° C.; about 10° C.; about 12° C.; about 14° C.; about 16° C.; about 18° C.; about 20° C.; about 22° C.; about 24° C.; about 26° C.; about 28° C.; about 30° C.; about 32° C.; about 34° C.; about 36° C.; about 38° C.; about 40° C.; about 42° C.; about 44° C.; about 46° C.; about 48° C.; about 50° C.; about 52° C.; about 54° C.; about 56°

C.; about 58° C.; about 60° C.; about 62° C.; about 64° C.; about 66° C.; about 68° C.; about 70° C.; and any value therein.

In still further configurations, the methods disclosed herein may further comprise the step of spraying an aliquot (e.g., about 10 mL to about 100 mL per kilogram of beans) of the flavor-infused spirit onto the coffee beans prior to blending the flavor-infused spirit with the coffee beans. For instance, in various configurations, the aliquot may range from about 10 mL to about 100 mL per kg of coffee beans, such as about 10 mL/kg; about 15 mL/kg; about 20 mL/kg; about 25 mL/kg; about 30 mL/kg; about 35 mL/kg; about 40 mL/kg; about 45 mL/kg; about 50 mL/kg; about 55 mL/kg; about 60 mL/kg; about 65 mL/kg; about 70 mL/kg; about 75 mL/kg; about 80 mL/kg; about 85 mL/kg; about 90 mL/kg; about 95 mL/kg; about 100 mL/kg; and any value therein. In some embodiments, flavor-infused spirit is blended with green coffee beans at a ratio of about 1% to about 10% of the green coffee beans' weight, such as about 1%; about 2%; about 3%; about 4%; about 5%; about 6%; about 7%; about 8%; about 9%; about 10%; or any value therein. Similarly, in some embodiments, the flavor-infused spirit is blended with green coffee beans for a period of time ranging from about 1 hour to about 80 hours, such as about 1 hour; about 2 hours; about 3 hours; about 4 hours; about 5 hours; about 6 hours; about 7 hours; about 8 hours; about 9 hours; about 10 hours; about 12 hours; about 14 hours; about 16 hours; about 18 hours; about 20 hours; about 22 hours; about 24 hours; about 26 hours; about 28 hours; about 30 hours; about 32 hours; about 34 hours; about 36 hours; about 38 hours; about 40 hours; about 42 hours; about 44 hours; about 46 hours; about 48 hours; about 50 hours; about 52 hours; about 54 hours; about 56 hours; about 58 hours; about 60 hours; about 62 hours; about 64 hours; about 66 hours; about 68 hours; about 70 hours; about 72 hours; about 74 hours; about 76 hours; about 78 hours; about 80 hours; and any value therein.

In still further embodiments, the methods may further comprise roasting the flavor-infused green coffee beans to obtain roasted, flavor-infused coffee beans. In various configurations, the roasted, flavor-infused coffee beans may be roasted to an internal temperature ranging from about 150° C. to about 300° C., such as about 150° C.; about 160° C.; about 170° C.; about 180° C.; about 190° C.; about 200° C.; about 210° C.; about 220° C.; about 230° C.; about 240° C.; about 250° C.; about 260° C.; about 270° C.; about 280° C.; about 290° C.; about 300° C.; or any value therein. For instance, in various configurations, the flavor-infused coffee beans may be roasted to a desired degree, such as at least one of: light roast, medium roast, and dark roast.

In some embodiments, the methods may further comprise grinding the flavor-infused roasted coffee beans to a particle size, as measured by mean particle diameter, ranging from about 90 µm to about 2,000 µm; including about 90 µm; about 100 µm; about 120 µm; about 140 µm; about 150 µm; about 170 µm; about 180 µm; about 200 µm; about 220 µm; about 250 µm; about 275 µm; about 300 µm; about 330 µm; about 360 µm; about 400 µm; about 420 µm; about 440 µm; about 450 µm; about 500 µm; µm; about 510 µm; about 520 µm; about 50 µm; about 540 µm; about 550 µm; about 560 µm; about 580 µm; about 600 µm; about 620 µm; about 640 µm; about 660 µm; about 680 µm; about 700 µm; about 720 µm; about 740 µm; about 760 µm; about 780 µm; about 800 µm; about 820 µm; about 840 µm; about 860 µm; about 880 µm; about 900 µm; about 920 µm; about 940 µm; about 960 µm; about 980 µm; about 1,000 µm; about 1,200 µm; about 1,400 µm; about 1,500 µm; about 1750 µm; about 1900 µm; about 2000 µm; and any value therein.

In some embodiments, the present disclosure relates to a method of preparing flavor-infused roasted coffee beans. For instance, in some configurations the method may comprise: extracting a flavor compound in a high-alcohol content spirit; separating the flavor compound from the high-alcohol content sprit to yield a flavor-infused spirit; blending the flavor-infused spirit with green coffee beans; separating the flavor-infused spirit from the green coffee beans to yield flavor-infused green coffee beans; and roasting the flavor-infused green coffee beans to yield flavor-infused roasted coffee beans. In the same or different embodiments, the briquettes of wood comprise at least one of natural wood, toasted wood, charred wood, burned wood, or smoked wood. In some configurations, the high-alcohol content spirit has an alcohol content of about 30 GL to about 70 GL. In still further embodiments, the briquettes of wood are extracted in the high-alcohol content spirit for a period of time ranging from about 1 hour to about 80 hours. Likewise, in some configurations the methods disclosed herein may further comprise the step of spraying an aliquot of the flavor-infused spirit onto the coffee beans prior to blending the flavor-infused spirit with the coffee beans. In some additional embodiments, the green coffee beans are steeped within the flavor-infused spirit for a period of time ranging from about 1 hour to about 80 hours, such as about 1 hour; about 2 hours; about 3 hours; about 4 hours; about 5 hours; about 6 hours; about 7 hours; about 8 hours; about 9 hours; about 10 hours; about 12 hours; about 14 hours; about 16 hours; about 18 hours; about 20 hours; about 22 hours; about 24 hours; about 26 hours; about 28 hours; about 30 hours; about 32 hours; about 34 hours; about 36 hours; about 38 hours; about 40 hours; about 42 hours; about 44 hours; about 46 hours; about 48 hours; about 50 hours; about 52 hours; about 54 hours; about 56 hours; about 58 hours; about 60 hours; about 62 hours; about 64 hours; about 66 hours; about 68 hours; about 70 hours; about 72 hours; about 74 hours; about 76 hours; about 78 hours; about 80 hours; and any value therein. In various configurations, the flavor-infused spirit is added to the green coffee beans in an amount ranging from about 1% to about 10% of the beans' weight, such as about 1%; about 2%; about 3%; about 4%; about 5%; about 6%; about 7%; about 8%; about 9%; about 10%; and any value therein.

In some embodiments, a method of preparing flavor-infused roasted coffee beans is disclosed. In certain configurations, the method comprises blending a flavor-infused spirit with green coffee beans, separating the flavor-infused spirit from the green coffee beans to yield flavor-infused green coffee beans; and roasting the flavor-infused green coffee beans to yield flavor-infused roasted coffee beans. In some embodiments, the flavor-infused spirit comprises an extract of at least one of: natural wood, toasted wood, charred wood, burned wood, or smoked wood. In some configurations, the high-alcohol content spirit has an alcohol content of about 30 GL to about 70 GL. In still further configurations, the flavor-infused spirit may be prepared by extracting a flavor compound into the high-alcohol content spirit over a period f time ranging from about 1 hour to about 80 hours, such as about such as about 1 hour; about 2 hours; about 3 hours; about 4 hours; about 5 hours; about 6 hours; about 7 hours; about 8 hours; about 9 hours; about 10 hours; about 12 hours; about 14 hours; about 16 hours; about 18 hours; about 20 hours; about 22 hours; about 24 hours; about 26 hours; about 28 hours; about 30 hours; about 32 hours; about 34 hours; about 36 hours; about 38 hours; about 40 hours; about 42 hours; about 44 hours; about 46 hours; about 48 hours; about 50 hours; about 52 hours; about 54 hours; about 56 hours; about 58 hours; about 60 hours; about 62 hours; about 64 hours; about 66 hours; about 68 hours; about 70 hours; about 72 hours; about 74 hours; about 76 hours; about 78 hours; about 80 hours; and any value therein.

In various additional configurations, a method of preparing flavor-infused roasted coffee beans is disclosed. In some embodiments, the method may comprise extracting a flavor compound in an aqueous solution to yield a flavor-infused aqueous solution; blending the flavor-infused aqueous solution with green coffee beans to yield flavor-infused green coffee beans; and roasting the flavor-infused green coffee beans to yield flavor infused roasted coffee beans. In some configurations, the techniques and methods disclosed herein may further comprise the step of spraying an aliquot of the flavor-infused spirit onto the coffee beans prior to blending the flavor-infused spirit with the coffee beans.

Furthermore, some embodiments of the present disclosure relate to flavor-infused coffee beans. For instance, in some embodiments, the flavor-infused coffee bean may comprise flavor compounds extracted from a source (e.g., a plant source) using a high-alcohol content spirit. In some embodiments, the flavor compounds extracted using a high-alcohol content spirit have been absorbed into the bean. In some embodiments, the plant source is a portion of wood, such as a briquette. However, any suitable plant source may be employed, including leaves, fruits, berries, nuts, flowers, and the like. In some additional embodiments, the high-alcohol content spirit has an alcohol content of about 30 GL to about 70 GL, such as about 30 GL; about 40 GL; about 50 GL; about 60 GL; about 70 GL; and any value therein. In further embodiments, the flavor-infused bean may be subjected to roasting after the flavor compounds have been absorbed into the bean. In yet further embodiments, the flavor compounds absorbed into the bean have undergone at least one of: caramelization; Maillard reactions, and pyrolysis, as a result of roasting the flavor-infused coffee bean.

Some embodiments of the present disclosure relate to flavor-infused green coffee beans. For instance, in various embodiments, the flavor-infused green coffee beans have not been appreciably roasted. In some implementations, the flavor-infused green coffee beans are prepared by steeping green coffee beans in direct contact with a flavor-infused spirit. The flavor-infused spirit may be prepared by extracting flavor compounds from a plant source into a high-alcohol content spirit. The plant source may be any suitable flavor containing plant source, such as leaves, herbs, flowers, spices, bark, wood, and the like. For instance, in some embodiments, the plant source may be wood briquettes. In various implementations, the wood briquettes may have their flavor profile modified prior to extraction in the high-alcohol content spirit. For instance, in some embodiments, the wood briquettes may be natural, toasted, burnt, charred, smoked, and the like. In various implementations, the high-alcohol content spirit has an alcohol content of about 30 GL to about 70 GL, such as about 30 GL; about 40 GL; about 50 GL; about 60 GL; about 70 GL; and any value therein. In various embodiments, the flavor-infused green coffee beans have absorbed the flavor compounds extracted from the plant source by the high-alcohol content spirit. In still further implementations, the flavor-infused green coffee beans may be roasted. In some configurations, the roasted flavor-infused coffee beans contain flavor compounds extracted from the plant source by the high-alcohol content spirit, and the flavor compounds have been modified by the roasting process. For instance, in various implementations described herein, the roasted flavor-infused beans contain flavor compounds extracted from the plant source by the high-alcohol content spirit where the flavor compounds have undergone at least one of: caramelization, Maillard reaction, and pyrolysis. In still further implementations, the roasted flavor-infused coffee beans are substantially free of alcohol.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure. The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Consumers frequently enjoy flavored coffee beverages. To prepare flavored coffee beverages, flavor additives are typically incorporated into a brewed coffee beverage, either by the manufacturer prior to packaging, or by the consumer prior to consumption. However, these flavor additives frequently employ synthetic compounds in order to achieve a desired flavor profile, to promote shelf-stability, or to ensure ease of mixing. In general, consumers prefer to avoid such additives. Moreover, it can be inconvenient for the consumer to obtain and incorporate desirable flavors into their coffee beverages.

Other techniques exist for preparing flavored coffee beverages which do not require additional additives to be incorporated into the coffee beverage after brewing. For instance, flavor compounds may be added to roasted coffee beans to alter the flavor profile of the resultant brewed beverage. For example, some manufacturers instead incorporate dry flavor mixes into pre-ground coffee beans. However, these methods are still susceptible to many of the disadvantages discussed above. Namely, the flavor mixes frequently employ synthetic additives, which many consumers prefer to avoid. Moreover, dry flavored mixes do not necessarily have the same particle size as the ground coffee beans, frequently resulting in a tendency to settle which can lead to the production of inconsistent cups. Moreover, the desirable aromatic and volatile flavor compounds have a tendency to diffuse into the atmosphere, causing the flavor to weaken and grow stale. This problem is exacerbated by the fact that the pre-ground beans grow stale at an increased rate compared to roasted whole beans.

Other manufacturers avoid dry flavor mixes, and instead spray flavored oils onto the roasted beans prior to packaging. In this manner, the roasted coffee beans are left with an exterior coating of flavored oil which will infuse the brewed beverage with certain flavors. However, flavored oils frequently employ synthetic compounds to achieve the desired flavor profile, and many consumers typically prefer to avoid such additives. Moreover, the flavored oils must be added to the beans after roasting, since the high temperatures of the roasting process will destroy the volatile compounds responsible for the desired flavors. Such techniques are also prone to manufacturing inconsistencies. For instance, irregularities in the flavoring process can result in an inconsistent flavor profile, where certain regions of beans receive a thicker coating of oil than others. Furthermore, the surface coating of flavored oil is susceptible to deterioration—the desirable volatiles responsible for certain flavors will diffuse over time, and the oil may grow rancid during storage. Manufactures are also limited in the range of flavors which can be emulated, as it may be difficult to recreate particularly complex flavors using flavored oils.

In spite of the foregoing disadvantages, it is common for manufacturers to employ such flavoring techniques to mask off-flavors associated with stale or lower quality beans. As such, certain flavored coffees have acquired a perception of reduced quality, and a demand exists for a more premium flavored coffee product.

The flavors and aromas associated with alcoholic spirits—particularly aged alcoholic spirits—tend to be considered as a more premium product by consumers, and are thus desirable for infusion into coffee beans. Specifically, the dark, aromatic, and woody notes of barrel-aged liquors such as bourbons, scotches, rums, sherry, and the like have been found to pair well with the bittersweet notes of coffee, but are difficult to infuse into coffee beans using existing techniques. Several embodiments disclosed herein address these issues.

Figure 1:
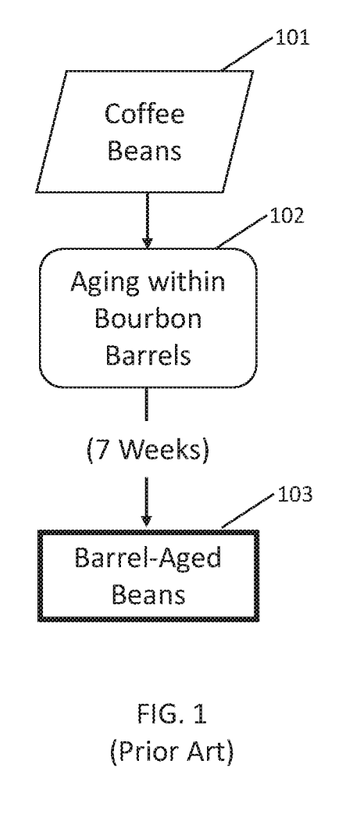
FIG. 1 depicts a flow chart illustrating prior art barrel-aging methods for infusing flavors into coffee beans.

The flavors and aromas of barrel aged spirits are complex, and are difficult to infuse into coffee beans through traditional means. Some manufacturers have attempted to infuse coffee beans with the flavors and aromas of aged spirits by housing the beans in barrels which have previously been used to age liquor. A prior art process flow for preparing barrel-aged beans in this manner is depicted in FIG. 1. As shown at box 101, coffee beans are provided. The coffee beans are then left within the interior of a barrel which has previously used to age a spirit, such as bourbon, as depicted at box 102. By allowing dried, roasted coffee beans to rest within barrels previously used to age bourbon, the gaseous volatile compounds residing within the wood of the bourbon-barrel are slowly absorbed by the beans to yield barrel-aged beans, as depicted at box 103.

Unfortunately, this process is unnecessarily slow, expensive, and complex. Since the process relies on the passive, gaseous infusion of volatile aromatic compounds into the coffee beans, the beans must be left to sit within the barrel for a period ranging from weeks to months. Since the infusion process may take several weeks to months to complete, such processes risk the beans becoming stale or rancid by the time sufficient infusion has occurred to appreciably flavor the beans. Moreover, the large amount of time required to prepare a batch of flavored beans greatly increases the cost of production. Further increasing costs of production, each barrel can only be used once or twice, since the flavors and aromas of the coffee beans simultaneously infuse back into the barrel itself, tainting future batches.

To overcome the disadvantages discussed above, several embodiments disclosed herein relate to methods suitable to infuse an alcohol-containing spirit with natural flavors and aromas, such as the desirable flavors and aromas of the woods typically used in the production of barrels used to age the spirit. In turn, the flavor-infused spirit may be used to infuse coffee beans with the desirable flavors and aromas of the wood and the spirit. Such an infusion process is more efficient than prior methods, and imparts a higher quality, more complete flavor profile into the beans. Also, the resulting beans exhibit a more standardized flavor profile, with less variance in the flavoring of each bean, and a reduced loss of flavor over time.

Several embodiments of the infusion process disclosed herein are more efficient than prior methods. As explained above, prior methods rely on indirect contact between the beans and the barrels in order to allow the slow, gaseous infusion of volatile, aromatic compounds into the beans. In contrast, the techniques and methods disclosed herein, in several embodiments, greatly increase the efficiency and speed of production by allowing the flavor-infused spirit to rest in direct contact with the coffee beans. For instance, in various embodiments disclosed herein, the flavor-infused spirit is in direct contact with at least about 70%, at least 80%, at least 90%, or more, of the available surface area of the beans. The direct contact of the coffee beans with the flavor-infused spirit allows the infusion process to take place much more quickly. For instance, as discussed above, beans which have been flavored in an empty aging barrel typically require a standing period of about two months. Comparatively, according to the techniques and methods disclosed herein, a batch of flavor-infused coffee beans may be prepared by steeping the coffee beans in the flavor-infused spirit for less than about 12 hours. As such, the techniques described herein reduce the time required to infuse the beans with a desired flavor by a significant amount. For example, in several embodiments, the time is reduced by about 50%, about 60%, about 70%, about 80%, about 90%, about 95%, or about 98%. In addition to increasing the efficiency of the infusion process, the reduced infusion time further decreases the risk that the beans will become stale during infusion. Moreover, the shorter infusion time also reduces the risk of contamination by pathogenic microorganisms, such as bacteria or fungi, which are advantageously inhibited by the alcohol content of the flavor-infused spirit.

Similarly, the infusion process disclosed herein results in a more complete flavor infusion. As discussed above, prior techniques rely on the indirect contact between the barrel and the beans, and only the volatile aromatic compounds capable of diffusing into the beans are retained when the beans are removed from the barrel. As such, only a small fraction of the desirable flavor compounds residing within the barrel are absorbed by the beans. In contrast, the techniques and methods disclosed herein allow the wood to come into direct contact with the spirit, whereby desirable flavor compounds found within the wood are extracted into the spirit, allowing a more complete transfusion to occur, yielding a flavor-infused spirit having a more complete flavor profile. In a similar manner, the techniques and methods disclosed herein allow the flavor-infused spirit to rest in direct contact with the coffee beans. The direct contact between the flavor-infused spirit and coffee beans allows the beans to take up a more complete array of flavors, resulting in a more complex flavor profile in the bean.

Finally, in addition to imparting a richer, more complete flavor profile to the infused beans, it has been surprisingly found that the flavors infused into the beans are further developed upon roasting. As explained above, prior methods typically require that the beans be roasted before flavor compounds are sprayed onto the beans, since the oils and other flavor compounds reside on the exterior surfaces of the bean, and the volatile compounds responsible for imparting the desirable flavors would be destroyed upon roasting. In contrast, when green, unroasted, or even partially roasted beans are allowed to rest in direct contact with the flavor-infused spirit, the subtle notes of the wood are absorbed into the interior of the bean, and according to some embodiments, are then further developed through roasting. The additional flavor development achieved during roasting lends complex, subtle undertones to the roasted beans, which lend a rich, full-bodied flavor profile to the resultant brewed beverage.

Figure 2:
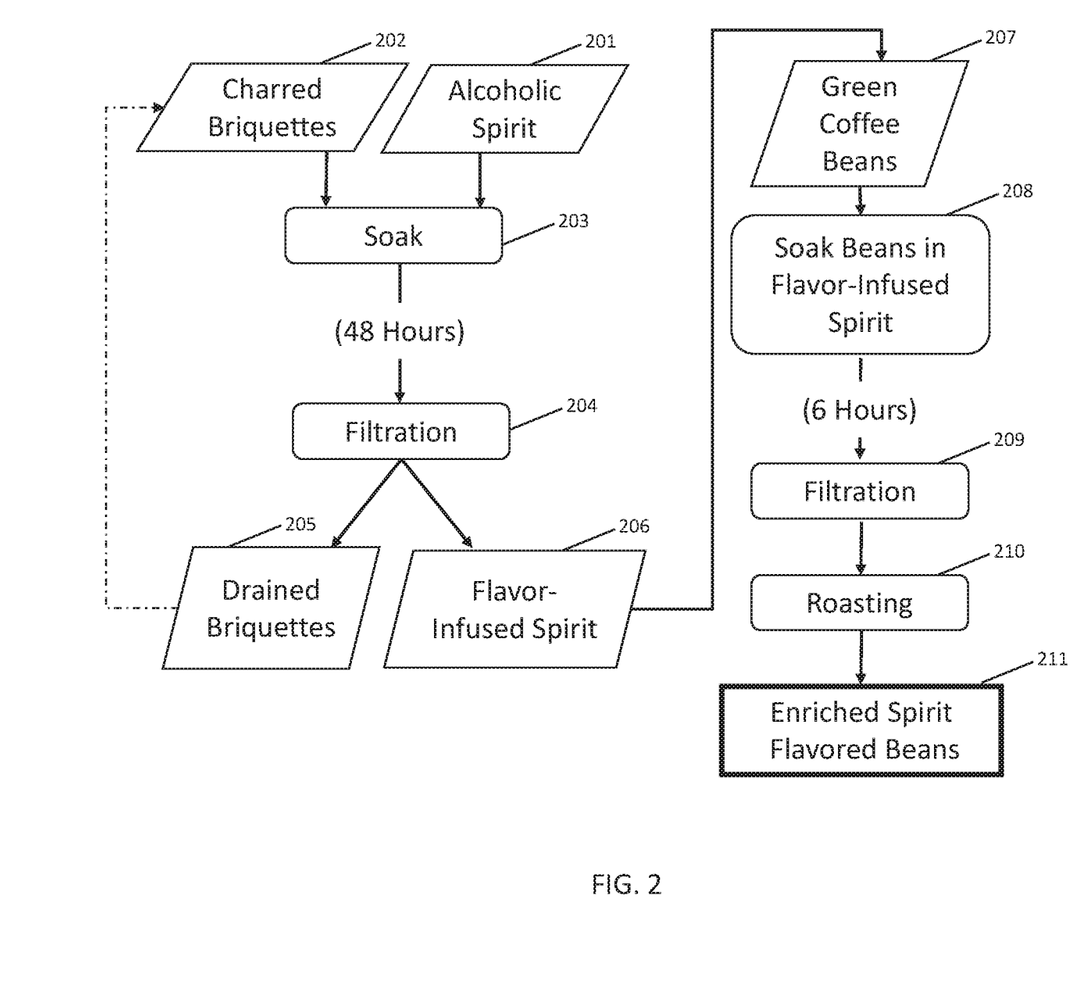
FIG. 2 depicts a flow chart illustrating a technique in accordance with the methods disclosed herein for infusing flavors into coffee beans.

As depicted in FIG. 2, in several embodiments, a flavor-infused spirit may be prepared by allowing a flavor-containing compound, such as a wood, to reside in an alcoholic solution for a sufficient time to allow desirable flavor components to be extracted into the alcoholic solution. Although the present disclosure is discussed in the context of infusing coffee beans with the flavors of woods and spirits—particularly bourbon and oak—it will be appreciated by the skilled artisan that a wide variety of flavor-containing compounds may be employed without deviating from the scope of the present disclosure.

As depicted at box 201, an alcoholic spirit is provided. In some configurations the alcoholic solution may be a spirit, such as bourbon whiskey, although additional spirits may be employed as well, including gin, tequila, vodka, rum, Scotch whisky, rye whiskey, cognac, brandy, sherry, and the like. In some embodiments, the spirit may be a high-alcohol content spirit. For instance, the high-alcohol content spirit may have an alcohol content of about 30 degrees Gay-Lussac (GL) or greater, such as about 30 GL; about 40 GL; about 50 GL; about 60 GL; about 70 GL; or any value therein. In various embodiments described herein, the alcoholic spirit is a whiskey, such as a bourbon whiskey.

The alcoholic spirit may be used to extract desirable flavors from a flavor-containing compound. As depicted in box 202, in several embodiments, charred briquettes of wood are provided as the flavor containing compound. Indeed, in various configurations, the flavor-containing compound may be an oaken wood such as American oak, French oak, European oak, Spanish oak, oriental oak, red oak, scrub oak, and the like, although a variety of different woods may be employed, including: maple, sugar maple, hard maple, soft maple, silver maple, cherry wood, apple wood, orange wood, apricot wood, peach wood, plum wood, pear wood, mulberry wood, mesquite wood, hickory wood, chestnut wood, pecan wood, alder wood, cedar wood, ash wood, and the like. To tailor the flavor infusion for specific taste, the flavor and aroma profile of the wood may be altered prior to extraction. For instance, the pieces of wood may be smoked, toasted, charred, burnt, or natural. Nevertheless, while various embodiments are described in terms of infusing an alcohol-containing spirit with the flavors and aromas of, e.g., oak, it will be appreciated that a similar infusion process may be performed utilizing nearly any compound containing desirable flavors, including a wide variety of other natural and plant-based compounds, such as berries, fruits, flowers, nuts, leaves, roots, extracts or components of any of the foregoing, and the like.

To prepare a flavor-infused spirit, the flavor-containing compound may be soaked in the alcoholic spirit to yield a flavor-infused spirit, as depicted at box 203. While the flavor-containing compound soaks in the alcoholic solution, desirable flavor-containing compounds are extracted into the spirit. Extraction may be allowed to occur for a period of time ranging from about 15 minutes to about 80 hours. For instance, in certain configurations, a wood may be allowed to reside within an alcoholic solution for about 15 minutes; about 30 minutes; about 1 hour; about 2 hours; about 3 hours; about 4 hours; about 5 hours; about 6 hours; about 7 hours; about 8 hours; about 9 hours; about 10 hours; about 12 hours; about 14 hours; about 16 hours; about 18 hours; about 20 hours; about 22 hours; about 24 hours; about 26 hours; about 28 hours; about 30 hours; about 32 hours; about 34 hours; about 36 hours; about 38 hours; about 40 hours; about 42 hours; about 44 hours; about 46 hours; about 48 hours; about 50 hours; about 52 hours; about 54 hours; about 56 hours; about 58 hours; about 60 hours; about 62 hours; about 64 hours; about 66 hours; about 68 hours; about 70 hours; about 72 hours; about 74 hours; about 76 hours; about 78 hours; about 80 hours; and any value therein.

It will be appreciated by those of skill in the art that the precise infusion time will depend on the strength of the alcoholic solution, the extraction characteristics of the flavor-containing compound, the desired flavor profile of the flavor-infused spirit, and similar factors. For example, to facilitate efficient extraction, the flavor-containing compound, such as wood, may be cut, trimmed, pulped, or otherwise partitioned into a more workable form having a greater surface area to increase the rate at which desirable flavor compounds will be extracted from the wood. For instance, in certain configurations, pieces of wood may be partitioned into cubes. In some embodiments, the cubes may be about 0.2 $in^3$; about 0.3 $in^3$; about 0.4 $in^3$; about 0.5 $in^3$; about 0.6 $in^3$; about 0.7 $in^3$; about 0.8 $in^3$; about 0.9 $in^3$; about 1.0 $in^3$; about 1.1 $in^3$; about 1.2 $in^3$; about 1.3 $in^3$; about 1.4 $in^3$; about 1.5 $in^3$; about 1.6 $in^3$; about 1.7 $in^3$; about 1.8 $in^3$; about 1.9 $in^3$; about 2.0; or any value therein. In other embodiments, the pieces of wood may be roughly chopped or pulped. Indeed, it will be appreciated by the skilled artisan that a wide variety of form factors may be employed without departing from the scope of the present disclosure. For instance in various additional configurations, the wood may be partitioned into staves, dowels, rods, or the like. For instance, in various configurations, the wood may be partitioned into dowels having a diameter of about 0.1 in to about 2.0 in, such as about 0.1 in; about 0.2 in; about 0.4 in; about 0.6 in about 0.8 in; about 1.0 in; about 1.2 in; about 1.4 in; about 1.6 in; about 1.8 in; about 2.0 in; or any value therein. Similarly, the wooden dowels may have a length of about 0.1 in to about 4 in, such as about 0.1 in; 0.2 in; 0.4 in; 0.8 in; 1.0 in; 1.2 in; 1.4 in; 1.6 in; 1.8 in; 2.0 in; 2.2 in; 2.4 in; 2.6 in; 2.8 in; 3.0 in; 3.2 in; 3.4 in; 3.6 in; 3.8 in; 4.0 in; or any value therein. Nevertheless, it will be appreciated that a wide assortment of shapes and sizes may be employed without deviating from the scope of the present disclosure.

The extraction time is also affected by the ratio of the flavor-containing compound to the alcoholic solution. For instance, where a large proportion of flavor-containing compound is included in the extraction mix, the extraction time may be reduced by a corresponding degree. In certain configurations, the ratio of wood to spirit may range from about 1.0:0.8 to 1.0:3.0, such as about 1.0:0.8; about 1.0:1.0; about 1.0:1.2; about 1.0:1.4; about 1.0:1.6; about 1.0:1.8; about 1.0:2.0; about 1.0:2.2; about 1.0:2.4; about 1.0:2.6; about 1.0:2.8; about 1.0:3.0; or any value therein. Overall extraction time may also be reduced by subjecting the extraction mixture to agitation during at least a portion of the extraction process. Agitation helps to ensure that the extraction is consistent across all regions of the batch, and prevents pockets of the extraction mix from becoming over extracted. The agitation may be segmented or continuous throughout the extraction process, and implemented through any suitable mechanism including shaking, rolling, stirring vibrating, and the like.

The extraction temperature can also be varied depending on the type and amount of the flavor-containing compound being extracted. In some embodiments, the extraction temperature may range from about 1° C. to about 70° C., including about 2° C.; about 4° C.; about 6° C.; about 8° C.;

about 10° C.; about 12° C.; about 14° C.; about 16° C.; about 18° C.; about 20° C.; about 22° C.; about 24° C.; about 26° C.; about 28° C.; about 30° C.; about 32° C.; about 34° C.; about 36° C.; about 38° C.; about 40° C.; about 42° C.; about 44° C.; about 46° C.; about 48° C.; about 50° C.; about 52° C.; about 54° C.; about 56° C.; about 58° C.; about 60° C.; about 62° C.; about 64° C.; about 66° C.; about 68° C.; about 70° C.; and any value therein. In some embodiments, the temperature fluctuates during the extraction, while in other embodiments, the temperature may be maintained at a substantially constant value.

As the wood steeps in the spirit, desirable flavor and aroma compounds are extracted from the wood into the spirit to produce a flavor-infused spirit. Once a sufficient degree of infusion has occurred, the wood may be separated from the flavor-infused spirit as depicted at box 204. A variety of techniques for separating the wood from the spirit may be employed. For instance, in some embodiments, the wood may be filtered or screened out in order to isolate the flavor-infused spirit. While complete removal of the wood is not necessary, in various configurations, substantially all of the wood is removed from the flavor-infused spirit.

In some embodiments, the isolated wood may be reserved, as depicted at box 205. The reserved wood may be drained and then re-used to infuse subsequent batches of spirit. The isolated flavor-infused spirit, depicted at box 206, may be immediately utilized, or allowed to rest for a period of time to allow the flavors to further develop.

The flavor-infused spirit may be added to coffee beans as depicted at box 207. Although the present disclosure makes frequent reference to the use of green coffee beans, it will be appreciated that a wide assortment of coffee beans may be employed without deviating from the scope of the present disclosure. For instance, in some embodiments the coffee beans may be roasted whole coffee beans, for example, yellow coffee beans, red coffee beans, partially roasted coffee beans, dark roast coffee beans, light roast coffee beans, non-decaffeinated coffee, partially decaffeinated coffee, fully decaffeinated coffee, or unroasted green coffee beans. The coffee used can be any variety or species from any part of the world, and any blend thereof. For example, Arabica, Robusta, and any blend of Arabica & Robusta from any part of the world (such as Brazil, Indonesia, Central America, Africa, and the like). In some configurations, the coffee beans may comprise at least one of green coffee cherries, red coffee cherries, coffee flowers, coffee cherry skin, coffee cherry pulp, coffee cherry stalk, coffee cherry silverskin, coffee cherry mucilage, coffee cherry parchment, coffee cherry exocarp, coffee cherry mesocarp, and the like.

The coffee beans are allowed to rest in the flavor-infused spirit, as shown at box 208. As the beans soak in the flavor-infused spirit, the desirable flavor and aroma compounds of the spirit infuse into the coffee beans. The coffee beans are typically steeped in the flavor-infused spirit for a period of time sufficient to reach a desired degree of infusion. A typical steeping time may range from about 10 minutes to about 80 hours, such as about 10 minutes; about 15 minutes; about 30 minutes; about 1 hour; about 2 hours; about 3 hours; about 4 hours; about 5 hours; about 6 hours; about 7 hours; about 8 hours; about 9 hours; about 10 hours; about 12 hours; about 14 hours; about 16 hours; about 18 hours; about 20 hours; about 22 hours; about 24 hours; about 26 hours; about 28 hours; about 30 hours; about 32 hours; about 34 hours; about 36 hours; about 38 hours; about 40 hours; about 42 hours; about 44 hours; about 46 hours; about 48 hours; about 50 hours; about 52 hours; about 54 hours; about 56 hours; about 58 hours; about 60 hours; about 62 hours; about 64 hours; about 66 hours; about 68 hours; about 70 hours; about 72 hours; about 74 hours; about 76 hours; about 78 hours; about 80 hours; and any value therein. It will be appreciated by those of skill in the art that required for the beans to reach a sufficient degree of infusion will depend on the infusion strength of the flavor-infused spirit, the alcohol content of the flavor-infused spirit, the characteristics of the beans being infused, the desired flavor profile of the flavor-infused beans, and similar factors. Nevertheless, it is generally true that longer infusion times will typically result in a stronger flavor being infused into the beans.

However, the strength of infusion may also be altered by varying the ratio of beans to spirit. For instance, where a smaller proportion of beans are steeped within the flavor-infused spirit, infusion can be expected to take place more quickly. Conversely, where a large proportion of coffee beans are soaked in the spirit, infusion can be expected to proceed more slowly. In various implementations, the amount of spirit added to the coffee beans may range from about 1% of the weight of coffee beans to about 10% of the weight of coffee beans. For instance, in various embodiments, the amount of spirit may be about 1% of the weight of the coffee beans; about 2% of the weight of the coffee beans; about 3% of the weight of the coffee beans; about 4% of the weight of the coffee beans; about 5% of the weight of the coffee beans; about 6% of the weight of the coffee beans; about 7% of the weight of the coffee beans; about 8% of the weight of the coffee beans; about 9% of the weight of the coffee beans; about 10% of the weight of the coffee beans; or any value therein.

In some embodiments, the flavor profile of the beans may be enriched by an initial step prior to steeping in the flavor-infused spirit For instance, the coffee beans may be sprayed with an aliquot of the flavor-infused spirit and allowed to rest under the thin film for a period of time. In other embodiments, the coffee beans may be sprayed with an aromatic solution having a desired flavor profile. For instance, suitable aromatic solutions may include whiskeys, such as bourbon or scotch, or other spirits having a desired flavor profile, such as gin, tequila, vodka, brandy, sherry, and the like. A suitable amount of aromatic solution may range from about 10 mL per kilogram of beans to about 100 mL per kilogram of beans, such as about 10 mL/kg; about 20 mL/kg; about 30 mL/kg; about 40 mL/kg; about 50 mL/kg; about 60 mL/kg; about 70 mL/kg; about 80 mL/kg; about 90 mL/kg; about 100 mL/kg; and any value therein. After spraying, but prior to infusion, beans may be allowed to rest for a period of time ranging from about 5 minutes to about 20 hours, such as about 5 minutes; about 10 minutes; about 15 minutes; about 30 minutes; about 45 minutes; about 1 hour; about 2 hours; about 4 hours; about 5 hours; about 8 hours; about 10 hours; about 12 hours; about 15 hours; about 18 hours; about 20 hours; or any value therein. During this time, desirable flavor components may infuse into the beans. The beans may be allowed to steep in the flavor infused spirit at a temperature of about 1° C. to about 70° C., including about 2° C.; about 4° C.; about 8° C.; about 10° C.; about 20° C.; about 30° C.; about 40° C.; about 50° C.; about 60° C.; about 70° C.; about 80° C.; about 100° C.; about 120° C.; about 140° C.; about 160° C.; about 180° C.; or any value therein.

After the beans have been infused, the flavor-infused beans may be separated from the spirit, as depicted at box 209. Any suitable technique for separating the beans from the spirit may be employed. For instance, in some embodiments, the beans may be filtered or screened away from the flavor-infused spirit. In some configurations, the flavor-infused spirit may be drained away from the beans, and reserved for additional infusions.

Once the flavor-infused beans have been retrieved from the flavor-infused spirit, the beans may be roasted, as depicted at box 210. Unlike traditional flavoring techniques, where roasting will destroy the volatile aromatic compounds coated on the exterior of the beans, advantageously the flavors infused into the beans will further develop during the roasting process. Particularly, it has been discovered that the roasting process rounds out the flavor profile of the infused-beans, lending additional complexities and undertones to the finished cup, which cannot otherwise be obtained. The subtle, complex undertones which are developed through roasting are a result of a series of reactions occurring between the various sugars, fats, proteins, oils, and acids within the beans which occur at the elevated temperatures used to roast the beans. For instance, sugars and proteins within the beans caramelize and undergo Maillard reactions to form volatile flavor and aroma compounds such as 2-furfurylthiol. Similarly, the heat of roasting expels water from the beans, causing the beans to crack and concentrating the flavors within the bean. At certain roasting temperatures, pyrolysis occurs wherein organic compounds such as cellulose within the beans decompose into volatile, aromatic compounds which contribute complex, smokey tones to the finished product. In various configurations, the flavor-infused beans may be roasted at a temperature between about 150° C. to about 300° C., such as about 150° C.; about 160° C.; about 170° C.; about 180° C.; about 190° C.; about 200° C.; about 210° C.; about 220° C.; about 230° C.; about 240° C.; about 250° C.; about 260° C.; about 270° C.; about 280° C.; about 290° C.; about 300° C.; or any value therein. Furthermore, the elevated temperature of the roasting process causes residual alcohol to boil off of the bean. For instance, in some configurations, substantially all of the alcohol is boiled off of the beans during the roasting process, resulting in a substantially alcohol-free bean. After roasting, the beans may be cooled and allowed to rest where final flavor development will occur to obtain flavor-infused roasted coffee beans, as depicted at box 211.

Flavor infused coffee beverages may be prepared using flavor-infused coffee beans, such as those disclosed herein. In some embodiments, flavor-infused coffee beverages are prepared by reducing flavor-infused coffee beans to particles. Any type of grinding equipment may be employed to grind the flavor-infused coffee beans and reduce them to particles. Non-limiting examples of grinding equipment may include a cage mill, a hammer mill, a single-stage roller grinder, a multistage roller grinder, and the like. In some embodiments, it may be desirable to ensure that the equipment is maintained at low temperatures (e.g., about 0° C. to 20° C.) via cooling media to help preserve the desired flavor profile of the flavor-infused beans. However, in various embodiments, grinding may be performed at room temperature to facilitate preparation in a consumers home or a coffee shop.

In several embodiments, the flavor-infused particles may be extracted in water to produce a coffee beverage. For instance, in some embodiments, the flavor-infused particles may be steeped in a portion of boiling water to brew a hot coffee beverage. In additional embodiments, the flavor-infused particles may be steeped in cool water to produce a cold brew preparation. It has been discovered that brewed coffee extracts prepared from flavor-infused coffee beans prepared in accordance with the present disclosure exhibit a full, rich, spirit flavor which has been enhanced with robust wood notes, which could not be otherwise obtained.

While the present embodiments have been described with respect to the foregoing, those skilled in the art will readily appreciate that various changes and/or modifications can be made to the invention without departing from the spirit or scope of the embodiments as defined by the appended claims. In addition, while certain aspects of the present embodiments are presented below in certain claim forms, the various aspects of the invention are contemplated in any available claim form.

Indeed, the foregoing discussion is presented to enable a person skilled in the art to make and use one or more of the present embodiments disclosed herein. These examples are only illustrative and not intended in any way to restrict the general disclosure presented and the various aspects and features of this disclosure. The general principles described herein may be applied to embodiments and applications other than those discussed herein without departing from the spirit and scope of the disclosure. Indeed, this disclosure is not limited to the particular embodiments shown, but is instead to be accorded the widest scope consistent with the principles and features that are disclosed or suggested herein. For instance, many examples described below relate to techniques and methods for infusing coffee beans with a spirit, such as bourbon, which has been enriched with certain desirable flavors, such as oak. Nevertheless, it will be appreciated that the various features and aspects disclosed herein may be applied to a wide assortment of additional infusions, and are not limited to the specific embodiments disclosed herein.

Although certain aspects, advantages, and features are described herein, it is not necessary that any particular embodiment include or achieve any or all of those aspects, advantages, and features. Some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable.

As used herein, the term "beverage" has its ordinary and customary meaning, and includes, among other things, any edible liquid or substantially liquid substance or product having a flowing quality (e.g., juices, coffee beverages, teas, frozen yogurt, beer, wine, cocktails, liqueurs, spirits, cider, soft drinks, flavored water, energy drinks, soups, broths, combinations of the same, or the like).

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes, or tends toward, a particular value, amount, or characteristic.

Overall, the language of the claims is to be interpreted broadly based on the language employed in the claims. The claims are not to be limited to the non-exclusive embodiments and examples that are illustrated and described in this disclosure, or that are discussed during the prosecution of the application.

Those skilled in the art will also appreciate that in some embodiments the functionality provided by the components, structures, methods and processes discussed above may be provided in alternative ways, such as being split among more components or methods or consolidated into fewer components or methods. In addition, while various methods may be illustrated as being performed in a particular order, those skilled in the art will appreciate that in other embodiments the methods may be performed in other orders and in other manners.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of beverage preparation systems, techniques and methods have been disclosed. Although the systems, techniques, and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. A method of preparing flavor-infused roasted coffee beans, the method comprising:
   soaking portions of wood in a liquor to extract one or more flavors from the portions of wood, wherein the soaking comprises subjecting the liquor to uninterrupted agitation throughout the soaking, by shaking, rolling, stirring, or vibrating the liquor continuously;
   separating the portions of wood from the liquor to yield a flavor-infused liquor;
   prior to steeping:
     spraying green coffee beans with an aliquot of the flavor-infused liquor, wherein the amount of the flavor-infused liquor comprises from about 10 to 100 mL per kg of the green coffee beans; and
     resting the sprayed green coffee beans;
   steeping the green coffee beans in the flavor-infused liquor for a period between 10 minutes and 12 hours;
   separating the flavor-infused liquor from the green coffee beans to yield flavor-infused green coffee beans; and
   roasting the flavor-infused green coffee beans to yield flavor-infused roasted coffee beans.

2. The method of claim 1, wherein the portions of wood comprise at least one of natural wood, toasted wood, charred wood, burned wood, or smoked wood.

3. The method of claim 1, wherein the portions of wood is partitioned into at least one of a: brick, cube, dowel, rod, stave, briquette, or chip, having a volume ranging from about 1 cubic inch to about 10 cubic inches.

4. The method of claim 1, wherein the liquor has an alcohol content of about 30 GL to about 70 GL.

5. The method of claim 1, wherein the liquor comprises at least one of: bourbon, whiskey, gin, tequila, vodka, brandy, sherry, and rum.

6. The method of claim 1, wherein the portions of wood are soaking in the liquor for a period of time ranging from about 1 hour to about 80 hours.

7. The method of claim 1, wherein the flavor-infused liquor is blended with green coffee beans at a ratio of about 1% to about 10% of the green coffee beans' weight.

8. The method of claim 1, wherein the flavor-infused liquor is blended with green coffee beans for a period of time ranging from about 1 hour to about 80 hours.

9. The method of claim 1, wherein the flavor-infused green coffee beans are roasted to obtain at least one of: light roast, medium roast, and dark roast.

10. The method of claim 1, further comprising grinding the flavor-infused roasted coffee beans.

11. A method of preparing flavor-infused roasted coffee beans, the method comprising:
prior to steeping:
spraying green coffee beans with an aliquot of a flavor-infused liquor, wherein the amount of the flavor-infused liquor comprises from about 10 to 100 mL per kg of the green coffee beans; and
resting the sprayed green coffee beans;
steeping the green coffee beans in the flavor-infused liquor for a period between 10 minutes and 12 hours;
separating the flavor-infused liquor from the green coffee beans to yield flavor-infused green coffee beans; and
roasting the flavor-infused green coffee beans to yield flavor-infused roasted coffee beans,
wherein the flavor infused liquor is prepared by:
soaking portions of wood in a liquor to extract one or more flavors from the portions of wood, wherein the soaking comprises: subjecting the liquor to uninterrupted agitation throughout the soaking, by shaking, rolling, stirring, or vibrating the liquor continuously; and
separating the portions of wood from the liquor to yield the flavor-infused liquor.

12. The method of claim 11, wherein the flavor-infused liquor comprises an extract of at least one of natural wood, toasted wood, charred wood, burned wood, or smoked wood.

13. The method of claim 11, wherein the liquor has an alcohol content of about 30 GL to about 70 GL.

14. The method of claim 11, wherein the flavor-infused liquor is prepared by soaking the portions of wood in the liquor over a period of time ranging from about 1 hour to about 80 hours.

15. The method of claim 11, wherein the green coffee beans are steeped within the flavor-infused liquor for a period of time ranging from about 1 hour to about 80 hours.

16. The method of claim 1, further comprising:
separating substantially all of the portions of wood from the liquor by filtering or screening;
reserving the separated portions of wood from the flavor-infused liquor;
draining the separated portions of wood;
resting the separated portions of wood for a period of time;
soaking the reserved portions of wood in a second liquor; and
separating the reserved portions of wood from the second liquor to yield a second flavor-infused liquor.

17. The method of claim 1, further comprising:
after separating the flavor-infused liquor from the green coffee beans, reserving the flavor-infused liquor;
blending the reserved flavor-infused liquor with additional green coffee beans; and
separating the flavor-infused liquor from the additional green coffee beans to yield additional flavor-infused green coffee beans.

18. The method of claim 1, wherein the portions of wood comprise wood pulp.

* * * * *

UNITED STATES PATENT AND TRADEMARK OFFICE
CERTIFICATE OF CORRECTION

PATENT NO. : 11,406,114 B2
APPLICATION NO. : 16/016094
DATED : August 9, 2022
INVENTOR(S) : Denisley Gentil Bassoli It is certified that error appears in the above-identified patent and that said Letters Patent is hereby corrected as shown below:

On the Title Page

On Page 2, Column 1, Line 8, Item (56) under Other Publications, delete "scap;" and insert --scrap;--.

On Page 2, Column 2, Line 7, Item (56) under Other Publications, delete "Northest" and insert --Northeast--.

In the Specification

In Column 4, Line 60, delete "f" and insert --of--.

In Column 10, Line 23, delete "1." and insert --1.1--.

In Column 12, Line 33, delete "spirit" and insert --spirit.--.

Signed and Sealed this
Twenty-fifth Day of October, 2022

Katherine Kelly Vidal
*Director of the United States Patent and Trademark Office*